United States Patent [19]

Yoshimatsu

[11] Patent Number: 4,771,414

[45] Date of Patent: Sep. 13, 1988

[54] OPTICAL PICK-UP APPARATUS

[75] Inventor: Hiroshi Yoshimatsu, Kanagawa, Japan

[73] Assignee: Sony Corporation, Tokyo, Japan

[21] Appl. No.: 116,477

[22] Filed: Nov. 3, 1987

[30] Foreign Application Priority Data

Nov. 15, 1986 [JP] Japan .............................. 61-272416

[51] Int. Cl.$^4$ ............................................. G11B 7/00
[52] U.S. Cl. ..................................... 369/110; 369/13; 369/112
[58] Field of Search .................. 369/13, 110, 112, 121

[56] References Cited

U.S. PATENT DOCUMENTS

| | | | |
|---|---|---|---|
| 4,037,929 | 7/1977 | Bricot et al. | 369/110 |
| 4,633,338 | 12/1986 | Sato et al. | 369/13 |
| 4,638,470 | 1/1987 | Connell et al. | 369/110 |
| 4,672,593 | 6/1987 | Ojima et al. | 369/110 |
| 4,682,311 | 7/1987 | Matsubayashi et al. | 369/110 |

Primary Examiner—William L. Sikes
Assistant Examiner—Robert E. Wise
Attorney, Agent, or Firm—Philip M. Shaw, Jr.

[57] ABSTRACT

An optical pick-up apparatus comprises a light beam generating source, an objective lens for causing a light beam from the light beam generating source to impinge upon a record medium and receiving a reflected light beam from the record medium, a beam splitter for separating the reflected light beam from the light beam impinging upon the record medium, an analyzer constituted by first and second prisms each made of rock crystal and bonded together for producing at least three light beams based on the reflected light beam, and a photodetecting unit for detecting the light beams emerging from the analyzer. The analyzer is so disposed that the reflected light beam from the beam splitter enters into the first prism to reach the second prism, an optical axis of the first prism resides in a plane perpendicular to an optical axis of the reflected light beam entering into the first prism and is inclined at a predetermined angle in relation to a plane of polarization of the reflected light beam entering into the first prism, and an optical axis of the second prism resides in a plane perpendicular to the optical axis of the reflected light beam entering into the first prism and is inclined at a predetermined angle in relation to the optical axis of the first prism.

7 Claims, 4 Drawing Sheets

OPTICAL PICK-UP APPARATUS

BACKGROUND OF THE INVENTION

1. Field of the Invention

The present invention relates generally to optical pick-up apparatus used for reproducing an information signal recorded on record media, and more particularly, is directed to an improved optical pick-up apparatus for causing a light beam to impinge upon a record medium through an objective lens system and guiding a reflected light beam coming from the record medium through the objective lens system to a photodetector, so as to obtain from the photodetector an output signal representing information read from the record medium.

2. Description of the Prior Art

There has been proposed a so-called optical writable disc as one type of record disc which is available for optically writing an information signal in a record track provided thereon and optically reading an information signal written in the record tracks provided thereon. A magnetooptic disc is one of such optical writable discs and distinguished in that erasure of information signals and writing of the information signals are able to be conducted repeatedly thereon.

The magnetooptic disc comprises a disc-shaped base, a vertically magnetized layer provided for forming a recording layer on a surface of the disc-shaped base, and a protective layer formed to cover the vertically magnetized layer. Recording of information on the magnetooptic disc is effected by erasing an information signal written therein and writing a new information signal therein, and reproduction of information from the magnetooptic disc is effected by reading an information signal written therein.

In the event of the writing of information signals on the magnetooptic disc, the magnetooptic disc is rotated on an axis of rotation at a central portion thereof and a laser light beam demodulated in intensity by in response to the information signals is caused to impinge upon the vertically magnetized layer of the magnetooptic disc, to which a predetermined external magnetic field acts, so as to scan the same along a plurality of convolutions of the record track formed concentrically in the vertically magnetized layer to surround the central portion of the magnetooptic disc, so that the vertically magnetized layer is provided with inversions in the direction of magnetization in a pattern depending upon the modulation of the laser light beam. The record track is provided with pits arranged in a predetermined pattern to be used for, for example, tracking servo-control, as disclosed in, for example, U.S. Pat. No. 4,443,870.

Further, in the event of the reading of information signals from the magnetooptic disc, another laser light beam having power smaller than that of the laser light beam used for the writing of information signals is caused to impinge upon the vertically magnetized layer of the magnetooptic disc which is rotated so as to scan the same along the record track and a reflected laser light beam from the vertically magnetized layer is detected by a photodetector, so that a reproduced information signal corresponding to the information signals written in the magnetooptic disc, a tracking error signal for use in tracking servo-control, a focus error signal for use in focus servo-control, and other necessary signals are obtained from the photodetector. The reflected laser light beam from the vertically magnetized layer of the magnetooptic disc in the case of the reading of information signals is provided, in accordance with the Kerr effect, with rotations of a polarization plane thereof in response to inversions in the direction of magnetization made in the vertically magnetized layer to represent the information signals written therein. Such rotations of the polarization plane of the reflected laser light beam are detected by means, for example, of detecting each of orthogonal polarized components, that is, so-called P-polarized and S-polarized components of the reflected laser light beam separately and comparing detection outputs of the orthogonal polarized components with each other to produce a comparison output. Then, the reproduced information signal is generated based on the comparison output. Further, the tracking error signal is produced based on a detection output of changes in the reflected laser light beam caused in response to the arrangement of pits provided on the magnetooptic disc for the tracking servo-control and the focus error signal is produced based on a detection output of positions of a beam spot formed on the photodetector by the reflected laser light beam or a detection output of the configuration of the beam spot formed on the photodetector by the reflected laser light beam.

The reproduction of information from the magnetooptic disc is carried out by, for example, a disc player which has an optical pick-up apparatus constituting an optical system for reading information from the record track formed in the vertically magnetized layer of the magnetooptic disc.

One example of a previously proposed optical pick-up apparatus for use in the disc player is schematically shown in FIG. 1 and comprises an optical system 1 formed in the shape of a single unit which contains a semiconductor laser 2, an objective lens 5, a photodetector 15 and other optical elements, and mounted on the disc player to be movable along a direction (indicated by an arrow A) of the radius of a magnetooptic disc 6 having a vertically magnetized layer in which a plurality of convolutions of a record track are formed concentrically.

In the optical pick-up apparatus shown in FIG. 1, a laser light beam emitted from the semiconductor laser 2 passes through a collimating lens 3 to be collimated thereby and enters into a polarizing beam splitter 4 as, for example, a S-polarized component, to be deflected thereat to have its optical axis directed toward the objective lens 5. The laser light beam emerging from the polarizing beam splitter 4 is focused by the objective lens 5 to impinge upon the magnetooptic disc 6 so as to be provided with rotations of its polarization plane in response to inversions in the direction of magnetization which are made along the record track in the vertically magnetized layer of the magnetooptic disc 6 to represent information written in the record track and further modulated by the arrangement of pits disposed on the record track in the vertically magnetized layer to be used for the tracking servo-control. The laser light beam thus provided with the rotations of the polarization plane thereof and modulated by the arrangement of pits is reflected from the record track to be a reflected laser light beam.

The reflected laser light beam from the magnetooptic disc 6 returns through the objective lens 5 and passes through the polarizing beam splitter 4 without any change in the direction of its optical axis to enter into a beam splitter 7 as a P-polarized component. A part of this reflected laser light beam is deflected to have its optical axis directed to a photodetector 9 through a light-receiving lens 8. The remaining part of the reflected laser light beam passes through the beam splitter 7 on the straight to a half-wave plate 11 through a phase compensator 10.

The photodetector 9 which receives the reflected laser light beam from the beam splitter 7 generates, for example, a detection output signal obtained in response to the modulation caused on the reflected laser light beam by the arrangement of pits which is provided on the magnetooptic disc 6 for the tracking servo-control and another detection output signal obtained in accordance with the configuration of a beam spot formed by the reflected laser light beam on the photodetector 9, and supplies these detection output signals to an error signal generating section 12. The error signal generating section 12 produces a tracking error signal St representing deviations of a beam spot formed by the laser light beam on the vertically magnetized layer of the magnetooptic disc 6 from the center of the record track and a focus error signal Sf representing defocus of the laser light beam on the vertically magnetized layer of the magnetooptic disc 6, on the basis of each of the detection output signals from the photodetector 9. The tracking error signal St and the focus error signal Sf are used respectively for the tracking servo-control and the focus servo-control in which a lens driving mechanism (not shown in the drawings) provided in relation to the objective lens 5 is caused to operate.

The reflected laser light beam having passed through the half-wave plate 11 has its polarization plane rotated by 45 degrees and enters into a Wollaston prism 13 to be separated into a pair of orthogonal polarized components, that is, the P-polarized component and the S-polarized component. The P- and S-polarized components from the Wollaston prism 13 are led through a light-receiving lens 14 to the photodetector 15. The photodetector 15 detects separately the P- and S-polarized components by two light detecting elements independently contained therein and generates two detection output signals in response to variations in the respective polarized components to be supplied to an information signal generating section 16. In the information signal generating section 16, the rotation of the polarization plane of the reflected laser light beam caused by the record track in the vertically magnetized layer of the magnetooptic disc 6 is detected by means of comparing the detection output signals obtained from the photodetector 15 with each other to produce a comparison output which varies in response to the rotation of the polarization plane of the reflected laser light beam, and then a reproduced information signal Si is generated based on the comparison output. Reproduced information will be derived from the reproduced information signal Si.

In the previously proposed optical pick-up apparatus described above, the Wollaston prism 13 is employed for obtaining the reproduced information signal Si, and therefore, two light detecting elements for detecting respectively the orthogonal polarized components of the reflected laser light beam are assembled in the photodetector 15. However, since the photodetector 9 for supplying the detection output signals obtained based on the reflected laser light beam to the error signal generating section 12, which containing a group of light detecting elements, is required to be provided separately from the photodetector 15, the beam splitter 7 is disposed on an optical path for the reflected laser light beam from the magnetooptic disc 6 for dividing the reflected laser light beam into two parts, and an optical path for leading one of the divided parts of the reflected laser light beam to the photodetector 9 provided for production of the tracking error signal St and the focus error signal Sf and another optical path for leading the other of the divided parts of the reflected laser light beam to the photodetector 15 provided for production of the reproduced information signal Si are separately formed. This results in that a large number of optical elements such as lenses and beam splitters are used for constituting the apparatus and the number of steps in process of assembling the apparatus is increased, so that cost of production of the apparatus is raised. In addition, the spacial capacity of the apparatus is increased, and reduction in overall size of the apparatus is made difficult to be achieved.

Further, it is necessary to adjust individually two light detecting elements contained in the photodetector 15 to be placed for detecting accurately the respective orthogonal polarized components of the reflected laser light beam which are separated by the Wollaston prism 13, and therefore a large number of steps are undesirably required for setting and adjusting the photodetector 15.

OBJECTS AND SUMMARY OF THE INVENTION

Accordingly, it is an object of the present invention to provide an optical pick-up apparatus for causing a light beam to impinge upon a record medium through an objective lens and guiding a reflected light beam from the record medium through the objective lens to a photodetector so as to obtain from the photodetector output signals representing respectively information read from the record medium and tracking and focus conditions of the light beam on the record medium, which avoids the aforementioned problems and disadvantages encountered with the prior art.

Another object of the present invention to provide an optical pick-up apparatus in which a light beam emitted from a light beam generating source is focused by an objective lens to impinge upon a record medium such as a magnetooptic disc, orthogonal polarized components of a reflected light beam returning through the objective lens from the record medium are detected separately and compared with each other so as to produce a detection output signal representing information read from the record medium, and an error signal for servo-control such as tracking servo-control or focus servo-control is obtained based on variations in the reflected light beam caused by the record medium, which comprises optical elements reduced in number and is provided with minimized spacial capacity so as to have a relatively simple configuration and a reduced overall size.

A further object of the present invention is to provide an optical pick-up apparatus in which a light beam emitted from a light beam generating source is focused by an objective lens to impinge upon a record medium such as a magnetooptic disc, orthogonal polarized components of a reflected light beam returning through the objective lens from the record medium are detected separately and compared with each other so as to produce a detection output signal representing information read from the record medium, and an error signal for servo-control such as tracking servo-control or focus servo-control is obtained based on variations in the reflected light beam caused by the record medium, which has an improved optical path arrangement including light detecting elements so disposed as to be easily adjusted for producing the detection output signal representing information read from the record medium and the error signal for servo-control.

A still further object of the present invention is to provide an optical pick-up apparatus for causing a light beam to impinge upon a record medium through an objective lens and guiding a reflected light beam from the record medium through the objective lens to a photodetector so as to obtain from the photodetector output signals representing respectively information read from the record medium and tracking and focus conditions of the light beam on the record medium, which is suitable for use in a disc player operative to reproduce information recorded on a magnetooptic disc.

According to the present invention, there is provided an optical pick-up apparatus comprising a light beam generating source, an objective lens for focusing a light beam from the light beam generating source to cause the same to impinge upon a record medium and receiving a reflected light beam coming from the record medium, a beam splitter for separating the reflected light beam having passed through the objective lens from the light beam emitted from the light beam generating source to enter into the objective lens, an analyzer constituted by first and second prisms each made of rock crystal and bonded together, and a photodetecting unit including a plurality of light detecting elements for detecting separately a plurality of light beams emerging from the analyzer. The analyzer is so disposed that the reflected light beam from the beam splitter enters into the first prism to reach the second prism, an optical axis of the first prism resides in a plane which is substantially perpendicular to an optical axis of the reflected light beam entering into the first prism and is inclined at a predetermined angle in relation to a plane of polarization of the reflected light beam entering into the first prism, and an optical axis of the second prism resides in a plane which is substantially perpendicular to the optical axis of the reflected light beam entering into the first prism and is inclined at a predetermined angle in relation to the optical axis of the first prism, so as to causing at least three light beams obtained base on the reflected light beam entering into the first prism to emerge therefrom.

In the optical pick-up apparatus thus constituted in accordance with the present invention, the reflected light beam from the record medium is led to enter into the analyzer and at least three light beams formed based on the reflected light beam emerge from the analyzer. Two of the three light beams emerging from the analyzer are formed by orthogonal polarized components separated respectively from the reflected light beam entering into the analyzer and the remaining one of the three beams includes both the orthogonal polarized components obtained based on the reflected light beam entering into the analyzer. The three light beams emerging from the analyzer are detected separately by the light detecting elements contained in the photodetecting unit to produce a first detection output signal obtained in response to variations in one of the orthogonal polarized components, a second detection output signal obtained in response to variations in the other of the orthogonal polarized components, and a third detection output signal obtained in response to variations in the reflected light beam in its entirety.

The first and second detection output signals thus obtained are compared with each other to produce a comparison output and a reproduced information signal is obtained based on the comparison output. Further, an error signal for servo-control such as tracking servo-control or focus servo-control is obtained based on the third detection output signal.

As described above, three light beams including two light beams formed by the orthogonal polarized components of the reflected light beam from the record medium and one light beam including both the orthogonal polarized components are obtained individually from a single analyzer and a plurality of light detecting elements for detecting the three light beams from the analyzer respectively are assembled in the photodetecting unit. Therefore, it is unnecessary to have such an arrangement that a beam splitter is disposed on an optical path for the reflected light beam from the record medium for dividing the reflected light beam into two parts and an optical path for leading one of the divided parts of the reflected light beam to a photodetector provided for producing an error signal for servo-control and another optical path for leading the other of the divided parts of the reflected light beam to a photodetector provided for producing a reproduced information signal are separately formed. Besides, a half wave plate is not required to be used.

Therefore, the apparatus according to the present invention can be composed of optical elements reduced in number and provided with minimized spacial capacity so as to have a relatively simple configuration and a reduced overall size. In addition, on the occasion of setting of the light detecting elements which are assembled in the photodetecting unit, adjustment of one of the light detecting elements for detecting a selected one of the three light beams from the analyzer enables the light detecting elements for detecting the remaining two of the three light beams from the analyzer to be also adjusted. Accordingly, setting and adjustment of each of the light detecting elements in the photodetecting unit can be easily conducted without a large number of steps in process of setting and adjusting the photodetecting unit.

The above and other objects, features and advantages of the present invention will become apparent from the following detailed description which is to be read in conjunction with the accompanying drawings.

DESCRIPTION OF THE PREFERRED EMBODIMENT

Figure 1:
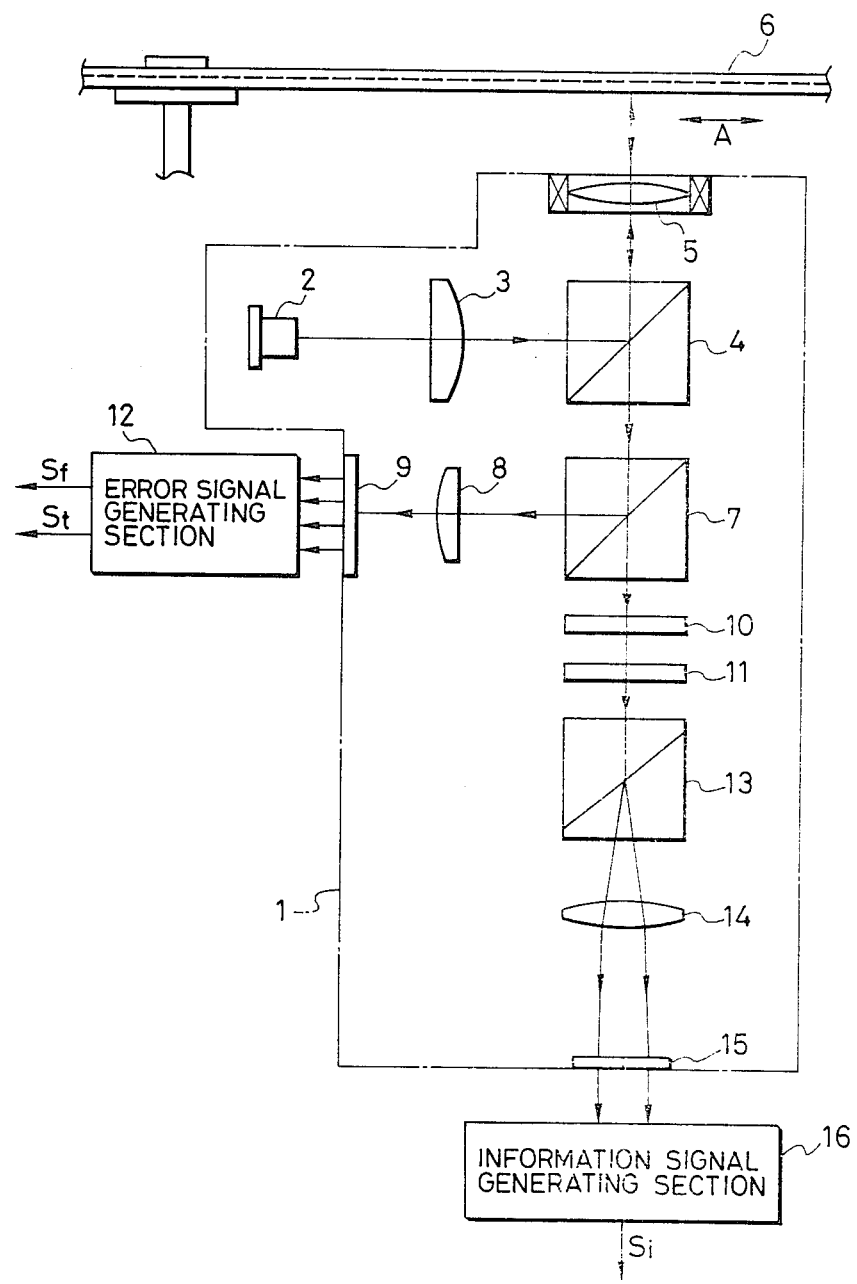
FIG. 1 is a schematic illustration showing an example of a previously proposed optical pick-up apparatus.
Figure 2:
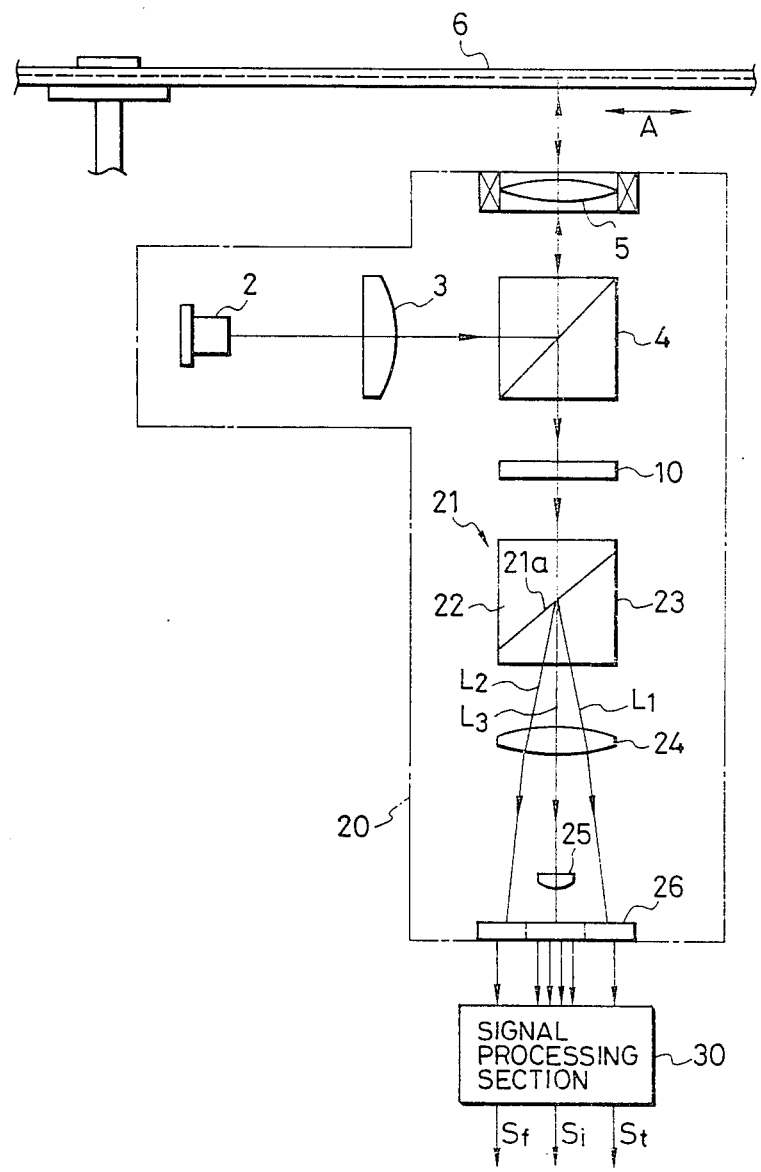
FIG. 2 is a schematic illustration showing one embodiment of optical pick-up apparatus according to the present invention.

FIG. 2 shows an example of the optical pick-up apparatus according to the present invention.

The example shown in FIG. 2 is so arranged as to be employed in a disc player for reproducing information recorded on a magnetooptic disc, and comprises an optical system 20 which is constituted in the shape of a single unit and mounted on the disc player to be movable along a direction (indicated by an arrow A) of the radius of a magnetooptic disc 6 having a vertically magnetized layer in which a plurality of convolutions of a record track are formed concentrically and a signal processing section 30 connected to the optical system 20.

In the optical system 20, a laser light beam emitted from a semiconductor laser 2 passes through a collimating lens 3 to be collimated thereby and enters into a polarizing beam splitter 4 as, for example, a S-polarized component, to be deflected thereat to have its optical axis directed toward the objective lens 5. The laser light beam emerging from the polarizing beam splitter 4 is focused by an objective lens 5 to impinge upon the magnetooptic disc 6 so as to be provided with rotations of its polarization plane in response to inversions in the direction of magnetization which are made along the record track in the vertically magnetized layer of the magnetooptic disc 6 to represent information written in the record track and further modulated by the arrangement of pits disposed on the record track in the vertically magnetized layer to be used for the tracking servo-control. The laser light beam thus provided with the rotations of the polarization plane thereof and modulated by the arrangement of pits is reflected from the record track to be a reflected laser light beam.

The reflected laser light beam from the magnetooptic disc 6 is received by the objective lens 5 and passes through the objective lens 5 and further the polarizing beam splitter 4 without any change in the direction of its optical axis to enter into an analyzer 21 through a phase compensator 10 as a P-polarized component. The analyzer 21 comprises a first prism 22 and a second prism 23 which are bonded together to form a hexahedron in its entirety, and is so disposed that the reflected laser light beam coming through the phase compensator 10 enters into the first prism 22 to reach the second prism 23.

Figure 3:
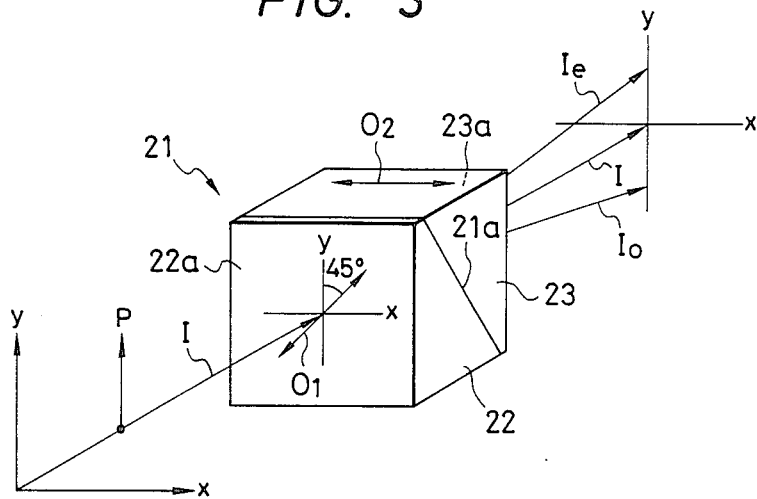
FIGS. 3 and 4 are illustrations used for explaining an analyzer employed in the embodiment shown in FIG. 2.

Each of the first and second prisms 22 and 23 constituting the analyzer 21 is made of uniaxial crystal material, such as rock crystal. As shown in FIG. 3, the first prism 22 has a plane of incidence 22a perpendicular to a direction I of the optical axis of the reflected laser light beam entering into the first prism 22, and the second prism 23 has a plane of emergence 23a substantially perpendicular to the direction I of the optical axis of the reflected laser light beam entering into the first prism 22. The first and second prism 22 and 23 are bonded together with a boundary plane 21a between. The boundary plane 21a is inclined substantially at an angle of 45 degrees in relation to the direction I of the optical axis of the reflected laser light beam entering into the first prism 22.

The optical axis of the first prism 22 resides in a plane which is substantially perpendicular to the direction I of the optical axis of the reflected light beam entering into the first prism 22, as indicated by an arrow $O_1$ in FIG. 3 and is inclined substantially at an angle of 45 degrees in relation to a plane of P-polarization (residing in a y-plane perpendicular to a x-plane) of the reflected laser light beam entering into the first prism 22. Further, the optical axis of the second prism 23 resides in a plane which is substantially perpendicular to the direction I of the optical axis of the reflected light beam entering into the first prism 22, as indicated by an arrow $O_2$ in FIG. 3 and is also substantially perpendicular to or parallel with the plane of P-polarization of the reflected laser light beam entering into the first prism 22. In other words, the optical axis of the second prism 23 is inclined substantially at an angle of 45 degrees in relation to the optical axis of the first prism 22.

Figure 4:
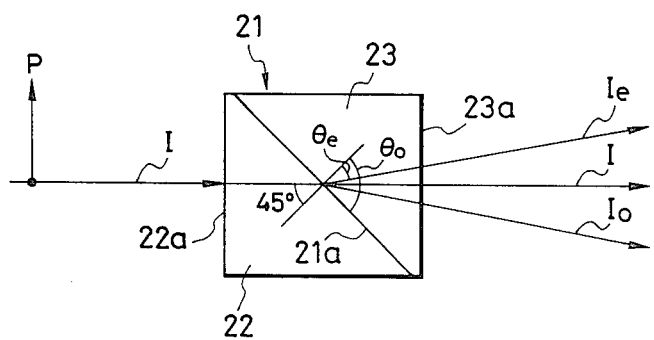

In the analyzer 21, since the respective optical axes of the first and second prisms 22 and 23 are selected as described above, the following three light beams are obtained at the boundary plane 21a based on the reflected laser light beam which enters into the analyzer 21 through the plane of incidence 22a thereof as the P-polarized component with the direction I of the optical axis substantially perpendicular to the plane of incidence 22a, as shown in FIG. 4: a first light beam which is the P-polarized component having a direction Ie of optical axis which is inclined at an angle of $\theta e$ in the y-plane in relation to a normal line perpendicular to the boundary plane 21a; a second light beam which is the S-polarized component having a direction Io of optical axis which is inclined at an angle of $\theta o$ ($\theta o > \theta e$) in the y-plane in relation to the normal line perpendicular to the boundary plane 21a; and a third light beam which is a resultant component composed of the P- and S-polarized components and positioned between the first and second light beams with the direction I of optical axis. The first, second and third light beams which are separated from one another emerge from the plane of emergence 23a of the second prism 23. That is, in the analyzer 21, the three light beams including the light beams of the P-polarized component, the light beams of the S-polarized component and the light beams of the resultant component composed of the P- and S-polarized components are formed separately based on the reflected laser light beam entering through the phase compensator 10 into the analyzer 21 in the form of P-polarized component.

As shown in FIG. 2, the first light beam ($L_1$) of the P-polarized component, the second light beam ($L_2$) of the S-polarized component, and the third light beam ($L_3$) of the resultant component composed of the P- and S-polarized components emerging from the analyzer 21 pass through a common condenser lens 24. The third light beam $L_3$ which is positioned between the first and second light beams $L_1$ and $L_2$ further passes through a cylindrical lens 25. Then, each of the first, second and third light beams $L_1$, $L_2$ and $L_3$ enters into a photodetecting unit 26.

The photodetecting unit 26 contains light detecting elements for detecting respectively the first and second light beams $L_1$ and $L_2$ and a group of light detecting elements for detecting the third light beam $L_3$, which are assembled therein, and detection output signals of the first, second and third light beams $L_1$, $L_2$ and $L_3$ are obtained separately from the light detecting elements and the group of the light detecting elements to be supplied to the signal processing section 30.

In the signal processing section 30, the rotation of the polarization plane of the reflected laser light beam caused by the record track in the vertically magnetized layer of the magnetooptic disc 6 is detected by means of comparing the detection output signal of the first light beam $L_1$ and the detection output signal of the second light beam $L_2$ with each other to produce a comparison output which varies in response to the rotation of the polarization plane of the reflected laser light beam, and a reproduced information signal Si is generated based on the comparison output. Then, reproduced information will be derived from the reproduced information signal Si.

In addition, in the signal processing section 30, the variations in the reflected laser light beam which are caused by the arrangement of pits provided on the magnetooptic disc 6 for tracking servo-control are detected based on the detection output signal of the third light beam $L_3$ to produce a tracking detection output signal, and a tracking error signal St representing deviations of a beam spot formed by the laser light beam on the vertically magnetized layer of the magnetooptic disc 6 from the center of the record track is formed base on the tracking detection output signal. Further, the configuration of a beam spot formed by the third light beam $L_3$ on the group of the light detecting elements for detecting the third light beam $L_3$ is detected to produce a focus detection output signal, and a focus error signal Sf representing defocus of the laser light beam on the vertically magnetized layer of the magnetooptic disc 6 is formed based on the focus detection output signal.

The tracking error signal St and the focus error signal Sf obtained from the signal processing section are used respectively for the tracking servo-control and the focus servo-control in which a lens driving mechanism (not shown in the drawings) provided in relation to the objective lens 5 is caused to operate.

Figure 5:
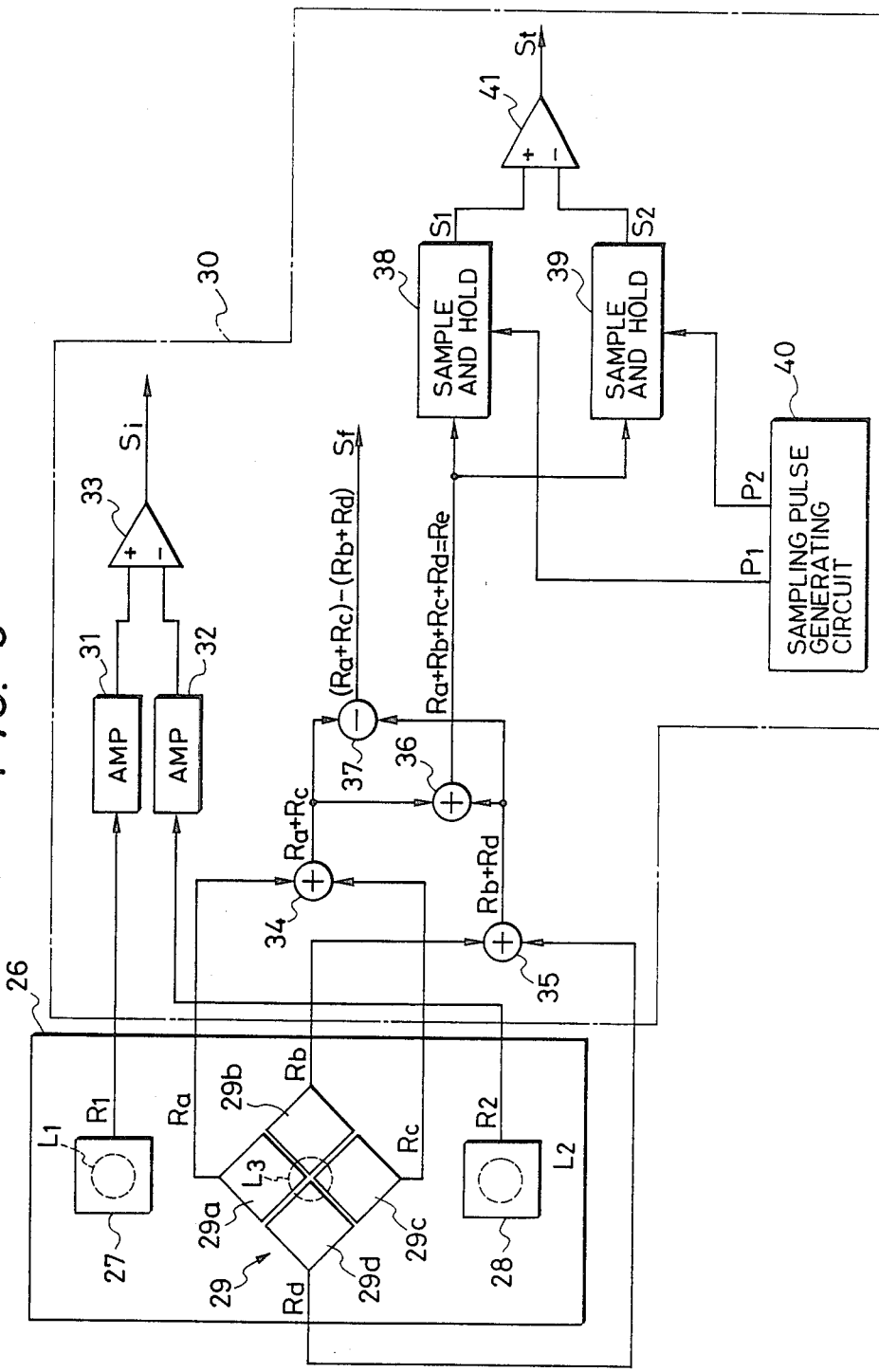
FIG. 5 is a schematic block diagram showing a practical example of the arrangement including a photodetecting unit and a signal processing section employed in the embodiment shown in FIG. 2.

FIG. 5 shows a practical example of the arrangement including the photodetecting unit 26 and the signal processing section 30.

In the practical example shown in FIG. 5, the photodetecting unit 26 contains a light detecting element 27 for detecting the first light beam $L_1$ of the P-polarized component from the analyzer 21, a light detecting element 28 for detecting the second light beam $L_2$ of the S-polarized component from the analyzer 21, and a light detecting element group 29 for detecting the third light beam $L_3$ of the resultant component composed of the P- and S-polarized components from the analyzer 21, which are arranged in such a manner that the light detecting element group 29 is located at the center. The light detecting element group 29 comprises four light detecting elements 29a, 29b, 29c and 29d. The first light beam $L_1$, the second light beam $L_2$ and the third light beam $L_3$ are caused to impinge upon the light detecting element 27, the light detecting element 28 and the light detecting element group 29, respectively. In setting and adjustment of the light detecting elements 27 and 28 and the light detecting element group 29 for causing the first, second and third light beams $L_1$, $L_2$ and $L_3$ to impinge appropriately upon the light detecting elements 27 and 28 and the light detecting element group 29, respectively, it is required only to adjust the photodetecting unit 26 so that the third light beam $L_3$ impinges appropriately upon the light detecting element group 29 which is located at the center. As a result of such an adjustment, the first and second light beams $L_1$ and $L_2$ are caused to impinge also appropriately upon the first and second light detecting elements 27 and 28, respectively.

A detection output signal $R_1$ is obtained from the light detecting element 27 and a detection output signal $R_2$ is obtained from the light detecting element 28. Further, detection output signals Ra, Rb, Rc and Rd are obtained from the light detecting elements 29a, 29b, 29c and 29d constituting the light detecting element group 29. These detection output signals $R_1$, $R_2$ and Ra to Rd are supplied to the signal processing section 30.

In the signal processing section 30, the detection output signal $R_1$ from the light detecting element 27 and the detection output signal $R_2$ from the light detecting element 28 are amplified in amplifying circuits 31 and 32, respectively, and then compared with each other in a differential amplifier 33. The differential amplifier 33 produces a comparison output signal representing the difference between the detection output signals $R_1$ and $R_2$ and the comparison output signal is derived from the differential amplifier 33 as the reproduced information signal Si.

The detection output signals Ra and Rc are supplied to an adder 34 to produce an output signal Ra+Rc, and similarly, the detection output signals Rb and Rd are supplied to an adder 35 to produce an output signal Rb+Rd. The output signal Ra+Rc and the output signal Rb+Rd are supplied to an adder 36 so that a sum total output signal Re (Ra+Rb+Rc+Rd) is obtained from the adder 36. Then, the sum total output signal Re is supplied to each of sample and hold circuits 38 and 39.

The sample and hold circuits 38 and 39 are supplied also with sampling pulses $P_1$ and $P_2$, respectively, from a sampling pulse generating circuit 40. The sampling pulses $P_1$ and $P_2$ have a time difference therebetween which corresponds to a pattern of the arrangement of pits which is provided on the magnetooptic disc 6 for tracking servo-control. Then, a sample/hold output signal $S_1$ obtained through the sampling and holding operation to which the sum total output signal Re is subjected in accordance with the sampling pulse $P_1$ is derived from the sample and hold circuit 38, and a sample/hold output signal $S_2$ obtained through the sampling and holding operation to which the sum total output signal Re is subjected in accordance with the sampling pulse $P_2$ is derived from the sample and hold circuit 39. The sample/hold output signals $S_1$ and $S_2$ are compared with each other are supplied to a differential circuit 41 to be compared with each other, and a comparison output signal corresponding to the difference between the sample/hold output signals $S_1$ and $S_2$ is obtained from the differential circuit 41 as the tracking error signal St.

Further, the output signals Ra+Rc and Rb+Rd are supplied also to a subtracter 37 and a difference output signal (Ra+Rc) - (Rb+Rd) is obtained from the subtracter 37 as the focus error signal Sf.

Although, in the above described embodiment, the optical axis of the first prism 22 constituting the analyzer 21 resides in the plane substantially perpendicular to the direction I of the optical axis of the reflected laser light beam entering into the first prism 22 and is inclined at 45 degrees in relation to the plane of P-polarization of the reflected laser light beam entering into the first prism 22, it is to be understood that the optical axis of the first prism constituting the analyzer used in the optical pick-up apparatus according to the present invention is not necessarily required to be inclined at 45 degrees in relation to the plane of P-polarization of the reflected laser light beam entering into the first prism, but may be arranged to incline at an angle smaller or larger than 45 degrees in relation to the plane of the P-polarization of the reflected laser light beam entering into the first prism.

What is claimed is:
1. An optical pick-up apparatus comprising,
a light beam generating source for emitting a light beam, an objective lens for focusing the light beam emitted from said light beam generating source to cause the same to impinge upon a record medium and receiving a reflected light beam coming from the record medium, a beam splitter for separating the reflected light beam having passed through said objective lens from the light beam emitted from said light beam generating source to enter into said objective lens, an analyzer comprising first and second prisms each made of uniaxial crystal material and bonded together, said analyzer being so disposed that the reflected light beam from said beam splitter enters into said first prism to reach said second prism, an optical axis of said first prism resides in a plane which is substantially perpendicular to an optical axis of the reflected light beam entering into said first prism and is inclined at a predetermined angle in relation to a plane of polarization of the reflected light beam entering into said first prism, and an optical axis of said second prism resides in a plane which is substantially perpendicular to the optical axis of the reflected light beam entering into said first prism and is inclined at a predetermined angle in relation to the optical axis of said first prism, so as to causing at least three light beams obtained base on the reflected light beam entering into said first prism to emerge therefrom, and a photodetecting unit including a plurality of light detecting elements for detecting separately the light beams emerging from the analyzer.

2. An optical pick-up apparatus according to claim 1, wherein said first and second prisms are bonded together with a boundary plane between, said boundary plane being inclined at forty-five degrees in relation to the optical axis of the reflected laser light beam entering into said first prism.

3. An optical pick-up apparatus according to claim 2, wherein the optical axis of said second prism is inclined substantially at an angle of forty-five degrees in relation to the optical axis of said first prism.

4. An optical pick-up apparatus according to claim 3, wherein said first and second prisms have respectively a plane of incidence and a plain of emergence each substantially perpendicular to the optical axis of the reflected laser light beam entering into said first prism.

5. An optical pick-up apparatus according to claim 4, wherein the optical axis of said second prism is substantially perpendicular to a plane of P-polarization of the reflected laser light beam entering into said first prism.

6. An optical pick-up apparatus according to claim 3, wherein the optical axis of said first prism is inclined substantially at an angle of forty-five degrees in relation to a plane of P-polarization of the reflected laser light beam entering into said first prism.

7. An optical pick-up apparatus according to claim 1, wherein each of said first and second prisms constituting said analyzer is made of rock crystal.

* * * * *